(12) United States Patent
Maeda et al.

(10) Patent No.: US 7,905,412 B2
(45) Date of Patent: Mar. 15, 2011

(54) BAR CODE PROCESSING APPARATUS

(75) Inventors: Masaya Maeda, Kawasaki (JP); Bunpei Irie, Kawasaki (JP); Naotake Natori, Kunitachi (JP); Tomoyuki Hamamura, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 109 days.

(21) Appl. No.: 12/404,552

(22) Filed: Mar. 16, 2009

(65) Prior Publication Data

US 2009/0289121 A1    Nov. 26, 2009

(30) Foreign Application Priority Data

May 21, 2008   (JP) .................................. 2008-133334

(51) Int. Cl.
*G06K 7/10* (2006.01)
*G06F 17/00* (2006.01)
*G06F 19/00* (2011.01)

(52) U.S. Cl. ................... 235/462.14; 235/375; 235/454; 235/462.01; 235/462.02; 235/462.08; 235/462.09; 235/462.11; 235/462.15; 235/462.16; 235/462.24; 235/462.25; 235/491; 235/494

(58) Field of Classification Search ............... 235/454, 235/462.1–462.49, 494, 375, 462.01, 462.02, 235/462.08, 462.09, 491; 382/101, 173, 382/260

See application file for complete search history.

(56) References Cited

U.S. PATENT DOCUMENTS

| 2002/0186874 | A1* | 12/2002 | Price et al. | 382/133 |
| 2005/0269416 | A1* | 12/2005 | Sussmeier et al. | 235/494 |
| 2006/0118632 | A1* | 6/2006 | Joseph et al. | 235/462.1 |
| 2006/0291691 | A1* | 12/2006 | Laws | 382/101 |
| 2007/0091341 | A1* | 4/2007 | Yamada | 358/1.12 |

FOREIGN PATENT DOCUMENTS

| JP | 2004-246795 | 9/2004 |
| WO | WO 98/00806 | 1/1998 |

* cited by examiner

*Primary Examiner* — Thien M. Le
*Assistant Examiner* — Tuyen K Vo
(74) *Attorney, Agent, or Firm* — Pillsbury Winthrop Shaw Pittman, LLP

(57) ABSTRACT

An image processing apparatus according to one embodiment of the invention includes a first image reading unit configured to read an image from an object to be read by visible light, a second image reading unit configured to read an image from the object to be read by invisible light, a first detection unit configured to detect a background image from a first read image read by the first image reading unit, a registration unit configured to register feature information indicative of a feature of the background image detected by the first detection unit, and a second detection unit configured to detect an image indicative of code information from a second read image read by the second image reading unit on the basis of the feature information registered in the registration unit.

5 Claims, 5 Drawing Sheets

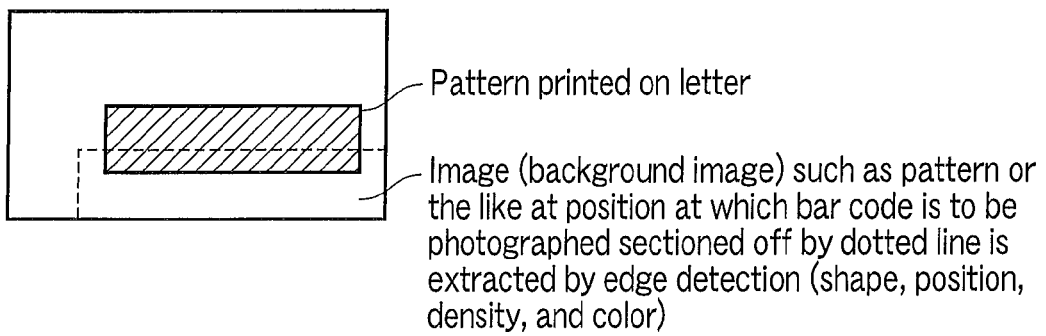
FIG. 3
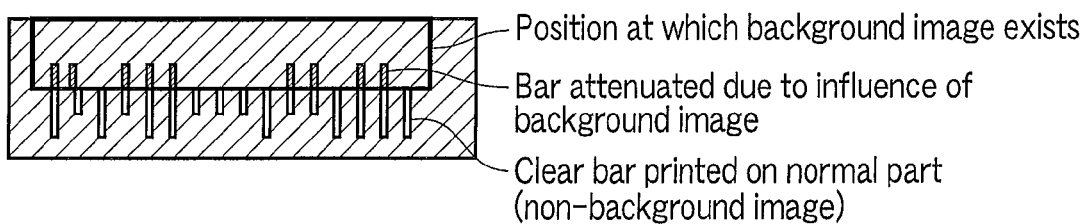
FIG. 4
```
#Color, density, contrast extension coefficient
Black, 50, 180
Black, 51, 179
  :
Black, 250, 50
  :
Blue, 50, 230
  :
```
FIG. 5

BAR CODE PROCESSING APPARATUS

CROSS-REFERENCE TO RELATED APPLICATIONS

This application is based upon and claims the benefit of priority from prior Japanese Patent Application No. 2008-133334, filed May 21, 2008, the entire contents of which are incorporated herein by reference.

BACKGROUND OF THE INVENTION

1. Field of the Invention

One embodiment of the present invention relates to an image processing apparatus, bar code processing apparatus, and image processing method for processing an image such as a fluorescent bar code and the like printed on the postal matter and the like.

2. Description of the Related Art

A fluorescent bar code to be printed on the postal matter and the like has a property of becoming largely less luminous depending on the background color of a letter, and hence when part of the bars overlap the background color, the bar code cannot be correctly recognized in some cases. In this problem, if a background image such as a pattern or the like described on the letter can be correctly estimated, the expectations of being able to obtain a correct recognition result of the bar code is enhanced. However, it is difficult to estimate the background image by the processing of a conventional fluorescent bar code scanner alone in view of the property of an image obtained from the scanner.

As one of the solutions for the above problem, Jpn. Pat. Appln. KOKAI Publication No. 2004-246795 (Pat. Document 1) discloses a robust recognition method for a bar code image influenced by the background state.

In the technique disclosed in above Pat. Document 1, the apparatus is constituted of a single scanner apparatus, and hence a sufficient effect cannot be also obtained. More specifically, although the proposed technique is a technique peculiar in the threshold determination method in the binarization processing used in the bar code recognition, bar information buried in the background is not included in the representative value used in the threshold calculation process. In other words, a sufficient margin is afforded at the time of determination of the binarization processing threshold by using the part of the bars that have already been detected. Thus, the bar code that shines only at feeble intensity exceeding the margin for a reason or the like that the background color is strong is not detected at the time of binarization processing. Further, the background pattern is not detected, and hence there is no criterion for judging whether or not a part light in color is due to the influence of the background pattern. Further, there is the possibility of the confidence factor of the bar being lowered at the time of the binarization.

BRIEF SUMMARY OF THE INVENTION

An object of the present invention is to provide an image processing apparatus, bar code processing apparatus, and image processing method capable of detecting a bar code more accurately from a paper leaf including a background image such as a pattern or the like.

An image processing apparatus according to an embodiment of the present invention comprises a first image reading unit configured to read an image from an object to be read by visible light, a second image reading unit configured to read an image from the object to be read by invisible light, a first detection unit configured to detect a background image from a first read image read by the first image reading unit, a registration unit configured to register feature information indicative of a feature of the background image detected by the first detection unit, and a second detection unit configured to detect an image indicative of code information from a second read image read by the second image reading unit on the basis of the feature information registered in the registration unit.

A bar code processing apparatus according to the embodiment of the present invention comprises a first image reading unit configured to read an image from an object to be read by visible light, a second image reading unit configured to read a fluorescent image from the object to be read by invisible light, a first detection unit configured to detect at least part of a background image included in the object to be read from a first read image read by the first image reading unit, a registration unit configured to register feature information indicative of a feature of a detection background image detected by the first detection unit, and a second detection unit configured to enhance a contrast of a background image area corresponding to at least part of the background image included in a second read image read by the second image reading unit on the basis of the feature information registered in the registration unit, and detect a fluorescent bar code from the second read image.

The bar code processing apparatus comprises the first image reading unit, the second image reading unit, the first detection unit, the registration unit, and the second detection unit, wherein the registration unit registers a contrast coefficient for each background condition calculated from data in which the attenuance of the fluorescent bar code formed on a predetermined background changes in accordance with changes in the color and density of a predetermined background, and registers the feature information including information indicative of a color and density of the detection background image, and the second detection unit calculates an adjustment range of a contrast of the background image area included in the second read image on the basis of information indicative of a color and density of the detection background image included in the feature information, enhances the contrast of the background image area on the basis of the contrast adjustment range and the contrast extension coefficient, and detects the fluorescent bar code from the second read image.

A bar code processing apparatus according to the embodiment of the present invention comprises a first image reading unit configured to read an image from an object to be read by visible light, a second image reading unit configured to read a fluorescent image from the object to be read by invisible light, a first detection unit configured to detect at least part of a background image included in the object to be read from a first read image read by the first image reading unit, a registration unit configured to register feature information indicative of a feature of a detection background image detected by the first detection unit, and a second detection unit configured to process a second read image read by the second image reading unit on the basis of the feature information registered in the registration unit, detect a plurality of bar candidates constituting a fluorescent bar code from the second read image by first labeling processing, determine whether or not it is necessary to detect bar candidates again on the basis of positions of one ends of the plurality of detected bar candidates, and detect, when it is determined that it is necessary to detect bar candidates again, a plurality of bar candidates from the second read image by second labeling processing.

The bar code processing apparatus comprises the first image reading unit, the second image reading unit, the first detection unit, the registration unit, and the second detection unit, wherein the second detection unit counts the number of bar candidates one ends of which are positioned on the same straight line, and determines whether or not it is necessary to detect bar candidates again on the basis of a ratio of the number of the counted bar candidates to the number of the plurality of bar candidates detected by the first labeling processing, furthermore the second detection unit makes part of an edge of the detection background image the straight line, and counts the number of bar candidates one ends of which are positioned on the straight line.

An image processing method according to the embodiment of the present invention comprises detecting a background image from a first read image read by visible light, registering feature information indicative of the detected background image, and detecting an image indicative of code information from a second read image read by invisible light on the basis of the registered feature information.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 3 is a view showing an example of a first image (visible light image) read by a visible light scanner;

FIG. 4 is a view showing an example of a second image (fluorescent bar code image) read by a fluorescent bar code scanner;

FIG. 5 is a view showing an example of a list of contrast extension coefficients;

DETAILED DESCRIPTION OF THE INVENTION

An embodiment of the present invention will be described below with reference to the accompanying drawings.

Figure 1:
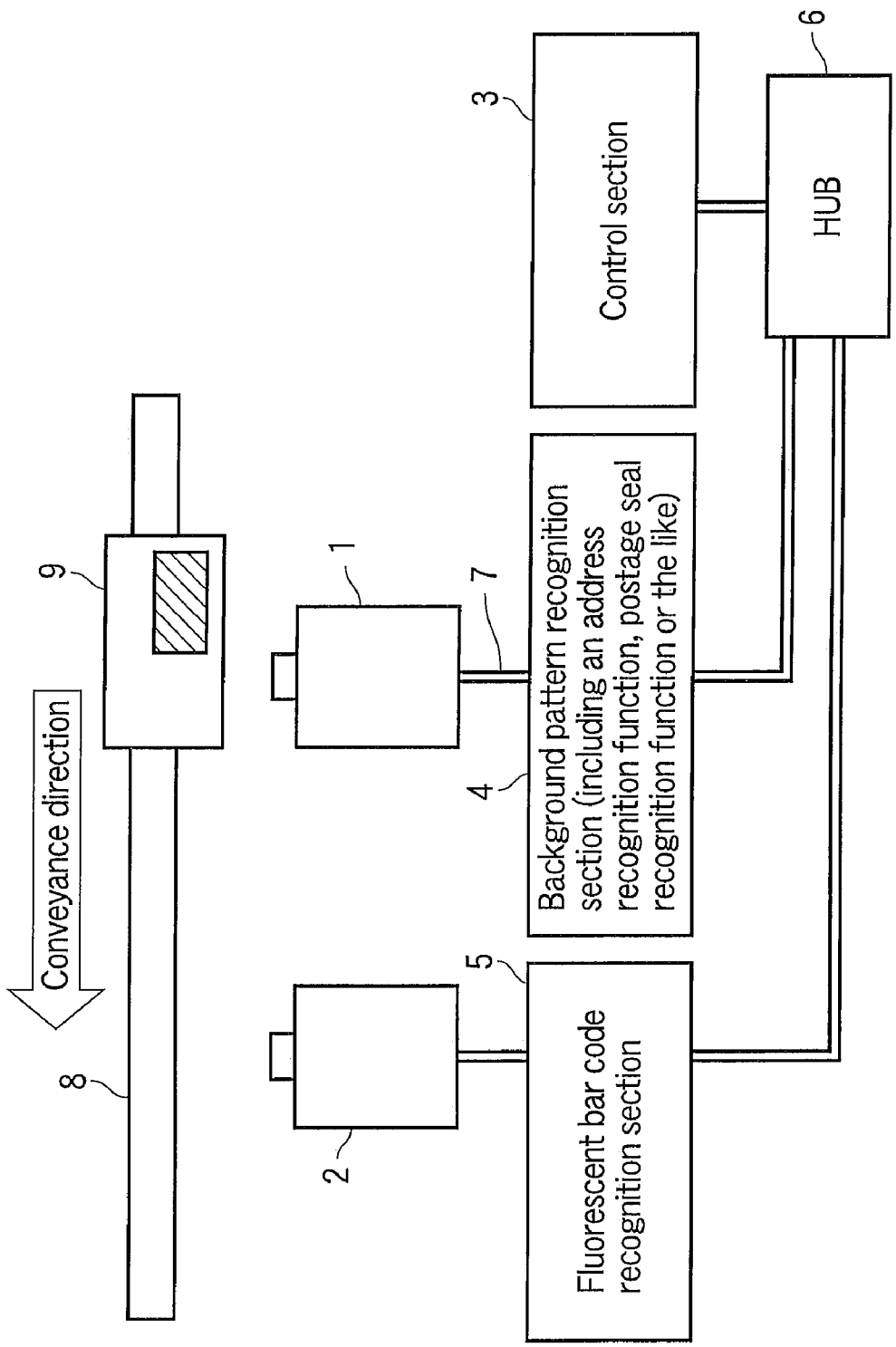
FIG. 1 is a view showing the schematic configuration of a bar code processing apparatus (image processing apparatus) according to an embodiment of the present invention.

FIG. 1 is a view showing the schematic configuration of a bar code processing apparatus (image processing apparatus) according to an embodiment of the present invention. The bar code processing apparatus can be applied to, for example, a mail-sorting equipment. The bar code processing apparatus is provided with a plurality of different types of scanners for reading images (the background image and fluorescent bar code) having different characteristics, and the fluorescent bar code is detected on the basis of the image read by the plurality of scanners.

As shown in FIG. 1, the bar code processing apparatus is provided with a visible light scanner 1, a fluorescent bar code scanner 2, a control section 3, a background pattern recognition section 4, a fluorescent bar code recognition section 5, a HUB 6, communication cables 7, and a conveyor belt 8.

The visible light scanner 1 reads an image (visible light image) of a letter 9 (object to be read) conveyed by the conveyor belt 8 by means of visible light. The fluorescent bar code scanner 2 reads an image (fluorescent image) of the letter 9 conveyed by the conveyor belt 8 by means of invisible light. An image (background image) such as a pattern or the like is printed on the letter 9, further a fluorescent bar code (fluorescent image) is printed on the letter 9. The visible light scanner 1 is used to read the image (background image) such as the pattern or the like. On the other hand, the fluorescent bar code scanner 2 is used to read the fluorescent bar code.

The control section 3 can be constituted of, for example, a PC (personal computer). Likewise, the background pattern recognition section 4 can also be constituted of, for example, a PC. Likewise, the fluorescent bar code recognition section 5 can be constituted of, for example, a PC.

The communication cables 7 connect the visible light scanner 1 and the background pattern recognition section 4 to each other, further connect the fluorescent bar code scanner 2 and the fluorescent bar code recognition section 5 to each other, connect the HUB 6 and the control section 3, the background pattern recognition section 4, and the fluorescent bar code recognition section 5 to each other.

The background pattern recognition section 4 is an image processing section for processing a first image read by the visible light scanner 1. It should be noted that it is assumed that the first image includes at least part of the background image of the image (background image) such as the pattern included in the letter 9. That is, it means that the first image may be an image of the whole letter 9, or may be an image of part of the letter 9.

Furthermore, the background pattern recognition section 4 is provided with an edge detection section for detecting an edge of at least part of the background image of the image (background image) such as the pattern included in the letter 9 from the first image, and a feature information storage section for storing feature information indicative of the feature of the background image specified by the edge detected by the edge detection section.

The feature information described above includes information indicative of the density and position of the specified background image. Further, when the specified background image is colored, the above-mentioned feature information includes information indicative of the density, position, and color of the specified background image. It should be noted that the background pattern recognition section 4 can also recognize character information such as an address and the like included in the first image, and a postage stamp or postage seal.

On the other hand, the fluorescent bar code recognition section 5 is an image processing section for processing a second image read by the fluorescent bar code scanner 2. It should be noted that detection of the fluorescent bar code will be described below on the premise that the second image includes a background image area corresponding to at least part of the background image of the image (background image) such as the pattern and the like included in the letter 9.

Further, the fluorescent bar code recognition section 5 is provided with a feature information reception section for receiving, for example, the feature information described above, a background luminance adjustment section for spreading a contrast difference of the background image area included in the second image, a normal differentiation binary labeling section for subjecting the second image to binarization processing by using a difference value between adjacent pixels of a plurality of pixels constituting the second image, a labeling result confirmation section for confirming whether or not a labeling result is unnatural, a background base differentiation binary labeling section for calculating the differentiation binarization threshold again from the feature information to perform relabeling, an area extraction section for extracting the bar code area, an individual bar determination section, a decoding section for decoding a row of the determined bars as an input, a recognition result selection section for selecting a decoding result to be employed when a plurality of recognition results are obtained, and a recognition result output section for outputting a recognition result to the sectioning equipment side and log information or the like. However, the binary labeling may not be differentiation binary labeling, and may be normal binary labeling. Further, the procedure after the bar code area extraction is only an example, and the recognition procedure is not limited to the above.

The specific procedure will be described below. It is premised that the visible light scanner 1 and the fluorescent bar code scanner 2 are calibrated in advance. That is, it is premised that the alignment of the visible light scanner 1 and the fluorescent bar code scanner 2 has already been completed.

Figure 2:
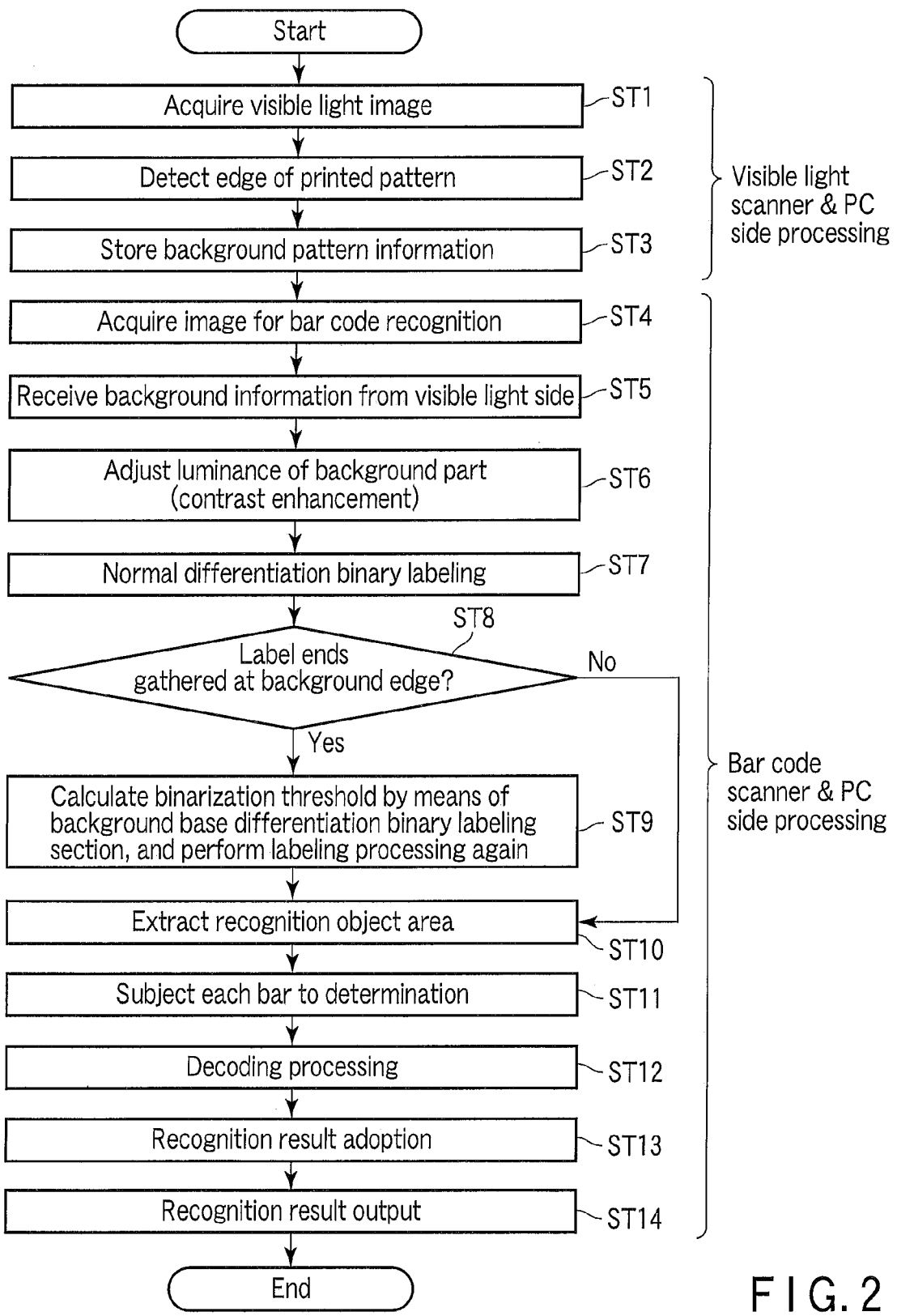
FIG. 2 is a flowchart showing an example of an overview of the bar code processing.

Subsequently, the operation procedure will be described below with reference to the flowchart shown in FIG. 2. FIG. 2 is a flowchart showing the overview of the bar code processing.

First, the operation procedure of the visible light scanner side will be described below.

The visible light scanner 1 reads an image of the letter 9 conveyed by the conveyor belt 8 by means of visible light (ST1). FIG. 3 is a view showing an example of the first image (visible light image) read by the visible light scanner 1. The shaded part in the first image shown in FIG. 3 corresponds to the image (background image) of the pattern or the like described on the letter, and the part sectioned off by a dotted line is part of the position at which the fluorescent bar code image is printed. That is, the part sectioned off by the dotted line is a position expected to be read by the fluorescent bar code scanner 2.

Subsequently, the edge detection section of the background pattern recognition section 4 subjects the first image to edge detection (ST2), and extracts the image (background image) such as the pattern or the like described on the letter. Regarding the edge detection method, the method is not necessarily limited. However, a method of estimating an edge from a differentiated values of adjacent pixels in the plurality of pixels constituting the first image is used here as an example. In this method, a difference between adjacent pixels in luminance is obtained for each of the vertical and horizontal directions, pixels having a luminance difference larger than a predetermined value are marked, when marked pixels more than a predetermined number are connected with each other, these pixels are recognized as an edge, and a position and a shape are obtained from the recognition result.

It should be noted that the edge detection processing for extracting the image such as the pattern or the like may be processing partly utilizing the edge detection processing for recognition of the address, recognition of the postage stamp, and recognition of the postage seal, or may be specific edge detection processing in which the target is limited to only the printing area for the fluorescent bar code image.

When the position and shape of the edge of the image (background image) such as the pattern or the like have been estimated in this way (that is, when the position and shape of the specified background image specified by the edge have been estimated), the inside (specified background image) surrounded by the edge is observed, and information on the density is obtained. In this case, it is assumed that an average luminance value is obtained as the density information. When the image is colored, it is also assumed that color information is additionally obtained.

The feature information storage section stores the feature information including the density, position, shape, and color of the specified background image (ST3). The feature information storage section is a memory in the PC constituting the background pattern recognition section 4. Alternatively, the feature information storage section may be an external storage device such as a hard disk connected to the PC constituting the background pattern recognition section 4. Further, as shown in FIG. 1, the background pattern recognition section 4 corresponding to the visible light scanner 1, and the fluorescent bar code recognition section 5 corresponding to the fluorescent bar code scanner 2 exist separately from each other, and hence, the feature information stored in the feature information storage section (memory) of the background pattern recognition section 4 may be transmitted to the fluorescent bar code recognition section 5 at this point in time, or the feature information stored in the feature information storage section (memory) of the background pattern recognition section 4 may be transmitted to the fluorescent bar code recognition section 5 later.

Next, the operation procedure on the fluorescent bar code scanner side will be described below.

For example, the fluorescent bar code printed on the letter is a four-state bar code. That is, the fluorescent bar code is constituted of four types of bars, i.e., a short timing bar, an ascender extending upwardly from the reference position, a descender extending downwardly from the reference position, and a long bar which is long, and is provided with an error-correcting function based on the Reed-Solomon decoding.

The fluorescent bar code scanner 2 reads the image of the letter 9 conveyed by the conveyor belt 8 by means of invisible light (ST4). FIG. 4 is a view showing an example of the second image (fluorescent bar code image) read by the fluorescent bar code scanner 2. The second image emits light at only parts having the fluorescence characteristic. Thus, when the letter itself has a fluorescence characteristic, even if the letter is a white letter, the photographed image becomes black. It is difficult to estimate an image (background image) such as the pattern or the like detected by using the visible light from such a second image. However, when part of the fluorescent bar code is overstruck on the image (background image) such as the pattern or the like as shown in FIG. 4, the second image has the characteristic that part of the fluorescent bars on the image (background image) such as the pattern or the like stop shining. This characteristic largely changes depending on the color and the density of the image (background image) such as the pattern or the like.

Then, the fluorescent bar code recognition section 5 communicates with the background pattern recognition section 4, and the feature information reception section of the fluorescent bar code recognition section 5 receives feature information transmitted from the background pattern recognition section 4 (ST5). It should be noted that the communication system used for the communication between the fluorescent bar code recognition section 5 and the background pattern recognition section 4 is not brought into question. At this time, when a difference or the like occurs between the visible light scanner 1 and the fluorescent bar code scanner 2 in the resolution, coordinate transformation or the like is performed so that the fluorescent bar code recognition section 5 can perform processing of the second image.

Next, a background contrast adjustment method utilizing feature information of the image (background image) such as the pattern or the like extracted from the first image obtained by the visible light scanner 1 will be described below.

The background luminance adjustment section of the fluorescent bar code recognition section 5 spreads a contrast difference of the background image area included in the second image by utilizing the feature information (ST6). As described previously, the bar code overstruck on the image (background image) such as the pattern or the like has become light on the second image, and hence the bar code that has become lighter by the background contrast adjustment is made conspicuous. That is, the existence position and shape of the background image included in the second image are confirmed by utilizing the feature information, and the area of the background image is made the contrast extension area.

Figure 6:
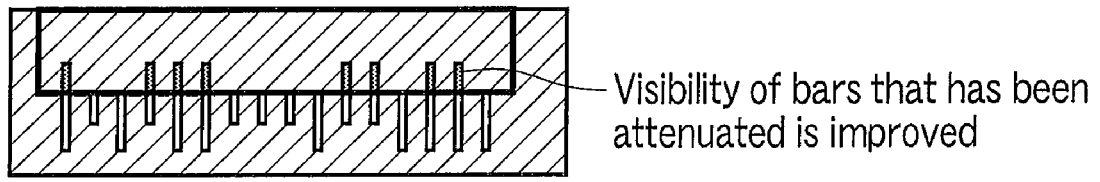
FIG. 6 is a view showing an example of a second image after being subjected to contrast extension.

On the other hand, the contrast extension coefficient is calculated from information indicative of the density and color of the specified background image included in the feature information. For example, the list of the contrast extension coefficients is experimentally obtained on the basis of a vast quantity of data, and is a list as shown in FIG. 5. That is, a list of the contrast extension coefficients calculated from data in which the attenuation of the fluorescent bar code formed on a predetermined background changes in accordance with changes in the color and density of the predetermined background is registered. By referring to this list of the contrast extension coefficients, a contrast extension coefficient of a case where, for example, the color of the background is black, and the density of the background is 15 is obtained. When the contrast extension coefficient is obtained, processing for enlarging a range from the luminance 0 to the contrast extension coefficient to 256 gradations (0 to 255) is performed. This processing is performed with respect to the background image area (or may be performed with respect to the entire second image). If there is a case where the gradation 255 is exceeded at the time of the enlarging processing, this is due to the saturation caused by the enlargement, and hence the value may be rounded off to the gradation 255. Although linear transformation is employed in the enlarging processing in this case, nonlinear transformation may be employed as a matter of course. FIG. 6 is a view showing an example of the second image after the contrast extension. As shown in FIG. 6, it can be seen that the visibility of the bars that has been attenuated is improved.

Next, the normal differentiation binary labeling section of the fluorescent bar code recognition section 5 subjects the second image to the normal differentiation binary labeling processing (ST7). In this normal differentiation binary labeling processing, the binarization processing is performed on the basis of the difference value between adjacent pixels. That is, pixels a difference value of which is larger than the threshold are detected, couples of pixels each having a difference value larger than the threshold are gathered together (labeling). Here, as for the threshold for determining the difference value described above, a difference value histogram for the entire image is prepared, and a difference value in which a part of upper several percent is the corresponding value is used as the threshold as it is. Regarding the normal differentiation binary labeling processing, any method may be employed as long as the differentiation binary labeling can be performed on the basis of the information on the entire image. By this labeling, a plurality of bar candidates constituting the fluorescent bar code are detected from the second image. Further, bars having a size smaller than a predetermined size are excluded from the plurality of bar candidates detected by the labeling. That is, the above procedure is performed as the measures against noise. As a result of this, it is possible to improve the detection accuracy of the bar candidates, and consequently improve the detection accuracy of the fluorescent bar code.

Figure 7:
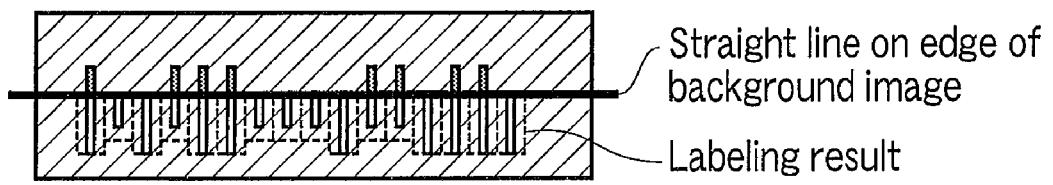
FIG. 7 is a view showing an example in which one ends of bars are arranged on a straight line.

Next, a detection result verification method in which how many one ends of bar candidates of the plurality of bar candidates detected by the normal differentiation binary labeling section coincide with the edge (a line of part of the edge) of the image (background image) such as the pattern or the like detected by the edge detection section is used as the index will be described below. More specifically, the labeling result confirmation section of the fluorescent bar code recognition section 5 confirms whether or not the labeling result is unnatural (ST8). For example, when one ends of a number of bar candidates detected by the normal differentiation binary labeling section coincide with the edge of the image such as the pattern or the like detected by the edge detection section, it can be determined that the fact is unnatural as a fluorescent bar code. This is because, as shown in FIG. 7, when the luminance value of the bars still remains attenuated due to the image such as the pattern or the like, and the bars cannot be appropriately detected, one ends of the bar candidates obtained by the labeling are arranged along the edge of the image such as the pattern or the like. In the confirmation method, the position and shape of the image such as the pattern or the like are known by the feature information, and hence it is observed whether or not one end of each of the bar candidates overlaps the edge part of the image such as the pattern or the like.

For example, the number of bar candidates one ends of which are positioned on the edge is counted, and it is determined whether or not it is necessary to detect bar candidates again on the basis of a ratio of the number of the counted bar candidates to the total number of the bar candidates detected by the labeling processing. Alternatively, the number of bar candidates one ends of which are positioned on the edge is counted, and it is determined whether or not it is necessary to detect bar candidates again on the basis of a ratio of the number of the counted bar candidates to a total number of bars (total number of bars constituting the original fluorescent bar code) prescribed in advance. Further, alternatively, the number of bar candidates one ends of which are positioned on the edge is counted, and it is determined whether or not it is necessary to detect bar candidates again on the basis of whether or not the number of the counted bar candidates is larger than a predetermined number.

When it is determined that it is not necessary to detect bar candidates again, i.e., when it is determined that there is no problem in the detection result of the bar candidates (the bar candidates are correctly detected) (ST8, NO), the next background base differentiation binary labeling processing (ST9) is skipped to advance the flow to the further next processing.

When it is determined that it is necessary to detect bar candidates again, i.e., when it is determined that there is some problem in the detection result of the bar candidates (the bar candidates are not detected correctly) (ST8, YES), the background base differentiation binary labeling section of the fluorescent bar code recognition section 5 calculates a differentiation binarization threshold from the feature information again, and subjects the second image to the labeling processing again. That is, the background base differentiation binary labeling processing is performed (ST9). The normal differentiation binary labeling threshold used in the labeling processing performed by the normal differentiation binary labeling section described above is not specialized in the background image area. Conversely, the background base differentiation binary labeling section calculates a second threshold specialized in the background image area.

By referring to the information described above indicative of the position and shape of the image such as the pattern or the like included in the feature information, the existence position of the image such as the pattern or the like on the second image can be acquired, and the existence position of the image such as the pattern or the like, i.e., the background image area included in the second image is made the area of the threshold calculation processing. This area is identical with the contrast extension area described previously.

Figure 8:
FIG. 8 is a view showing an example in which bars hidden behind the background image are embossed by differentiation binarization processing utilizing background image information.

When the second threshold for the differentiation binary labeling is calculated by limiting the area to the background image area, the value of the second threshold becomes smaller than that of the first threshold for the normal differentiation binary labeling. For example, by only the labeling processing based on the first threshold performed by the normal differentiation binary labeling section, a large luminance difference cannot be obtained when the bars are attenuated by the background image. Thus, a small second threshold that automatically separates the background image and the bars from each other is used to subject the entire second image to the labeling again. This enables the labeling as shown in FIG. 8.

At this time, when the differentiation binary labeling based on the second threshold is applied to the entire second image, if noise is increased in a non-background image area part other than the background image area included in the second image, the second threshold is applied to the background image area included in the second image, and the first threshold is applied to the non-background image area included in the second image. This makes it possible to suppress generation of noise.

In this embodiment, the labeling processing performed by using the second threshold is applied when bar candidates are detected again in this case. However, the labeling processing performed by using the second threshold may be applied when bar candidates are detected first.

Figure 9:
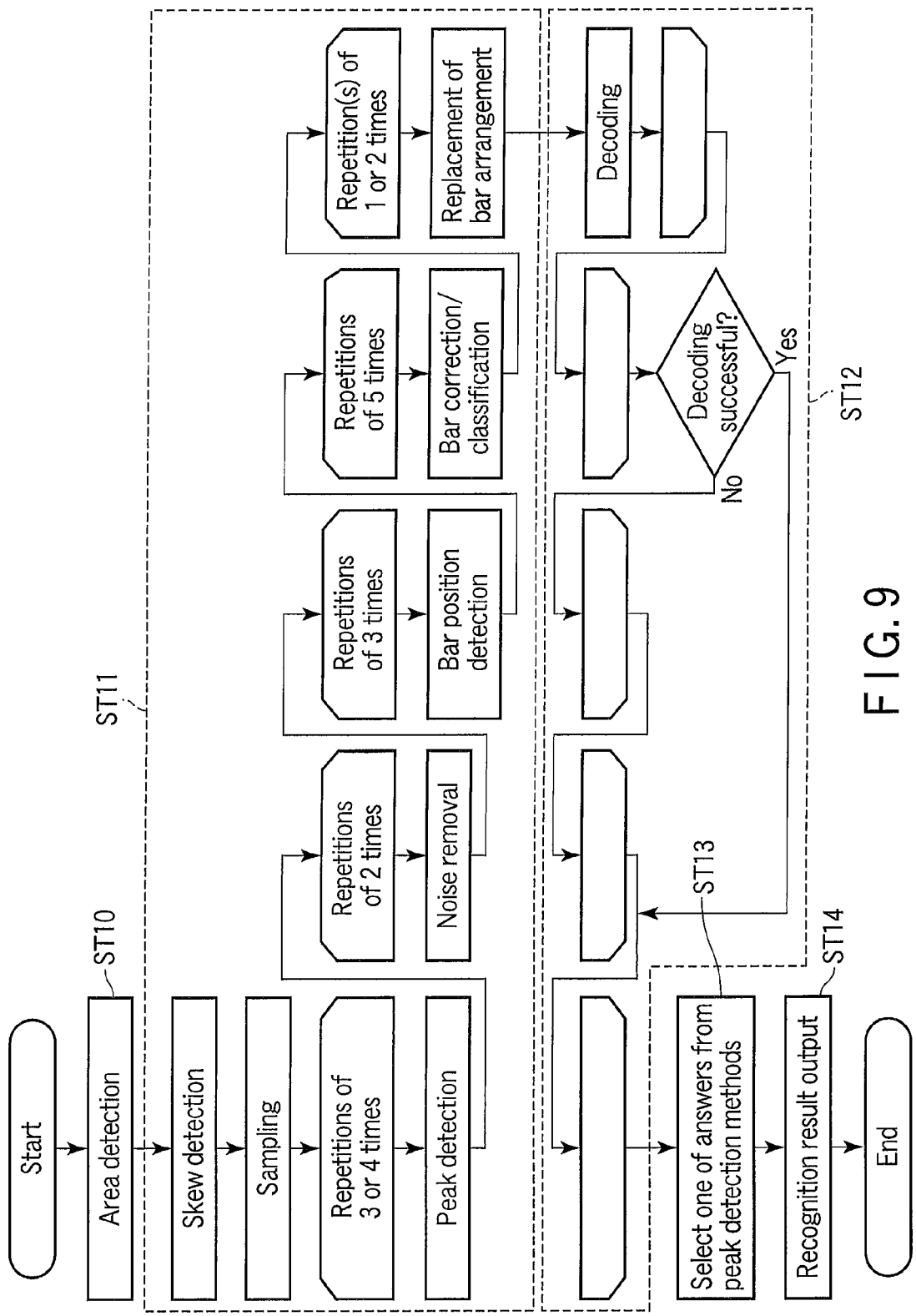
FIG. 9 is a flowchart showing an example of recognition processing of a fluorescent bar code.

Subsequently, the recognition object area is extracted (ST10), each bar of the recognition object area is subjected to determination (ST11), the bar code is decoded on the basis of the determination result (ST12), and the bar code is recognized (ST13, ST14). The processing from the extraction of the area of the recognition object (ST10) to the recognition result output (ST14) is as shown in, for example, the flowchart of FIG. 9.

That is, a part in which bars are arranged regularly with a predetermined pitch is detected as the recognition object area (ST10). Further, a skew angle of the bars is detected from the arrangement of the bars, and the lengths and positions of the bars are observed, whereby the bars are classified into four types (ST11).

The decoding section of the fluorescent bar code recognition section 5 decodes the bars in accordance with the arrangement order of the bars (ST12). When a number of decoded result are obtained by combining a plurality of methods with each other, the recognition result selection section employs an appropriate decoded result (ST13). For example, selection is performed by using the undetected number and the number of error corrections as a reference.

When the decoded result is obtained, the recognition result output section of the fluorescent bar code recognition section 5 outputs a recognition result to the sectioning equipment side and log information or the like (ST14).

By the processing described above, it is possible to prevent part of a plurality of bars constituting a fluorescent bar code from becoming unable to be detected by a background image. As a result of this, it is possible to prevent the recognition rate of the bar code from being lowered. Further, automatically calculating backward the threshold of the binarization processing used for detecting bar candidates by utilizing the feature information at the time of bar candidate detection while tinging the threshold with attenuation of the bars caused by the influence of the background image, as well as utilizing the calculated threshold largely contribute to prevention of lowering of the bar code recognition rate caused by the background image.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A bar code processing apparatus comprising:
a first image reading unit configured to read an image from an object to be read by visible light;
a second image reading unit configured to read a fluorescent image from the object to be read by invisible light;
a first detection unit configured to detect at least part of a background image included in the object to be read from a first read image read by the first image reading unit;
a registration unit configured to register feature information indicative of a feature of a detection background image detected by the first detection unit; and
a second detection unit configured to process a second read image read by the second image reading unit on the basis of the feature information registered in the registration unit, detect a plurality of bar candidates constituting a fluorescent bar code from the second read image by first labeling processing, determine whether or not it is necessary to detect bar candidates again on the basis of positions of one ends of the plurality of detected bar candidates, and detect, when it is determined that it is necessary to detect bar candidates again, a plurality of bar candidates from the second read image by second labeling processing,
wherein the second detection unit counts the number of bar candidates one ends of which are positioned on the same straight line, and determines whether or not it is necessary to detect bar candidates again on the basis of a ratio of the number of the counted bar candidates to the number of the plurality of bar candidates detected by the first labeling processing.

2. The apparatus according to claim 1, wherein
the second detection unit makes part of an edge of the detection background image the straight line, and counts the number of bar candidates one ends of which are positioned on the straight line.

3. A bar code processing apparatus comprising:
a first image reading unit configured to read an image from an object to be read by visible light;

a second image reading unit configured to read a fluorescent image from the object to be read by invisible light;
a first detection unit configured to detect at least part of a background image included in the object to be read from a first read image read by the first image reading unit;
a registration unit configured to register feature information indicative of a feature of a detection background image detected by the first detection unit; and
a second detection unit configured to process a second read image read by the second image reading unit on the basis of the feature information registered in the registration unit, detect a plurality of bar candidates constituting a fluorescent bar code from the second read image by first labeling processing, determine whether or not it is necessary to detect bar candidates again on the basis of positions of one ends of the plurality of detected bar candidates, and detect, when it is determined that it is necessary to detect bar candidates again, a plurality of bar candidates from the second read image by second labeling processing,
wherein the second detection unit counts the number of bar candidates one ends of which are positioned on the same straight line, and determines whether or not it is necessary to detect bar candidates again on the basis of a ratio of the number of the counted bar candidates to a total number of bars prescribed in advance.

4. A bar code processing apparatus comprising:
a first image reading unit configured to read an image from an object to be read by visible light;
a second image reading unit configured to read a fluorescent image from the object to be read by invisible light;
a first detection unit configured to detect at least part of a background image included in the object to be read from a first read image read by the first image reading unit;
a registration unit configured to register feature information indicative of a feature of a detection background image detected by the first detection unit; and
a second detection unit configured to process a second read image read by the second image reading unit on the basis of the feature information registered in the registration unit, detect a plurality of bar candidates constituting a fluorescent bar code from the second read image by first labeling processing, determine whether or not it is necessary to detect bar candidates again on the basis of positions of one ends of the plurality of detected bar candidates, and detect, when it is determined that it is necessary to detect bar candidates again, a plurality of bar candidates from the second read image by second labeling processing,
wherein the second detection unit counts the number of bar candidates one ends of which are positioned on the same straight line, and determines whether or not it is necessary to detect bar candidates again on the basis of whether or not the number of the counted bar candidates is larger than a predetermined number.

5. A bar code processing apparatus comprising:
a first image reading unit configured to read an image from an object to be read by visible light;
a second image reading unit configured to read a fluorescent image from the object to be read by invisible light;
a first detection unit configured to detect at least part of a background image included in the object to be read from a first read image read by the first image reading unit;
a registration unit configured to register feature information indicative of a feature of a detection background image detected by the first detection unit; and
a second detection unit configured to calculate a binarization threshold for detecting a fluorescent bar code from a second read image read by the second image reading unit on the basis of information obtained from a background image area corresponding to at least part of the background image included in the second read image on the basis of the feature information registered in the registration unit, and detect the fluorescent bar code from the second read image by binarization processing based on the binarization threshold,
wherein the second detection unit calculates a first binarization threshold for detecting the fluorescent bar code from the second read image on the basis of information obtained from a non-background image area different from the background image area in the second read image on the basis of the feature information registered in the registration unit,
calculates a second binarization threshold for detecting the fluorescent bar code from the second read image on the basis of information obtained from the background image area in the second read image on the basis of the feature information registered in the registration unit,
applies binarization processing based on the first binarization threshold to the non-background image area in the second read image to detect part of the fluorescent bar code from the non-background image area included in the second read image,
applies binarization processing based on the second binarization threshold to the background image area in the second read image to detect part of the fluorescent bar code from the background image area included in the second read image, and
detects the fluorescent bar code on the basis of the part of the fluorescent bar code detected from the non-background image area and the part of the fluorescent bar code detected from the background image area.

* * * * *